US008746060B2

(12) United States Patent
Carson-Rowland

(10) Patent No.: US 8,746,060 B2
(45) Date of Patent: Jun. 10, 2014

(54) METHOD OF CORRECTING FOR CONTAMINANT DISTORTION OF ELECTRICAL WASTEWATER LEVEL SENSORS

(76) Inventor: Stephen Carson-Rowland, Upper Mount Gravatt (AU)

( * ) Notice: Subject to any disclaimer, the term of this patent is extended or adjusted under 35 U.S.C. 154(b) by 384 days.

(21) Appl. No.: 13/217,160

(22) Filed: Aug. 24, 2011

(65) Prior Publication Data

US 2011/0303004 A1    Dec. 15, 2011

Related U.S. Application Data

(63) Continuation-in-part of application No. 13/031,211, filed on Feb. 19, 2011, now Pat. No. 8,684,700.

(60) Provisional application No. 61/305,984, filed on Feb. 19, 2010.

(51) Int. Cl.
*G01F 23/24*    (2006.01)

(52) U.S. Cl.
USPC ....................................................... 73/304 R

(58) Field of Classification Search
CPC ............................... G01F 23/24; G01F 23/241

USPC ....................................................... 73/290 R
See application file for complete search history.

(56) References Cited

U.S. PATENT DOCUMENTS

| 4,739,786 A * | 4/1988 | Parkinson ......................... 137/2 |
| 2007/0164751 A1* | 7/2007 | Parachini et al. ............. 324/557 |
| 2009/0082977 A1* | 3/2009 | Parkinson ....................... 702/55 |

* cited by examiner

*Primary Examiner* — Hezron E Williams
*Assistant Examiner* — Mark A. Shabman
(74) *Attorney, Agent, or Firm* — Stephen E Zweig

(57) ABSTRACT

A method, useful for wastewater liquid level indication rods in wastewater treatment facilities, of correcting the readings from the rod's electrode based liquid level sensors for inaccuracies and distortions caused by fat, oil, and grease (FOG) contaminant build up. The method may also detect how the electrical signals change as the liquid levels progress ever higher above the level of the measuring electrode of interest. These methods allow for the creation of improved wastewater liquid monitoring systems and management systems that can warn when cleaning is needed, help prevent pump burnout, overflow, and address other common wastewater management problems.

23 Claims, 15 Drawing Sheets

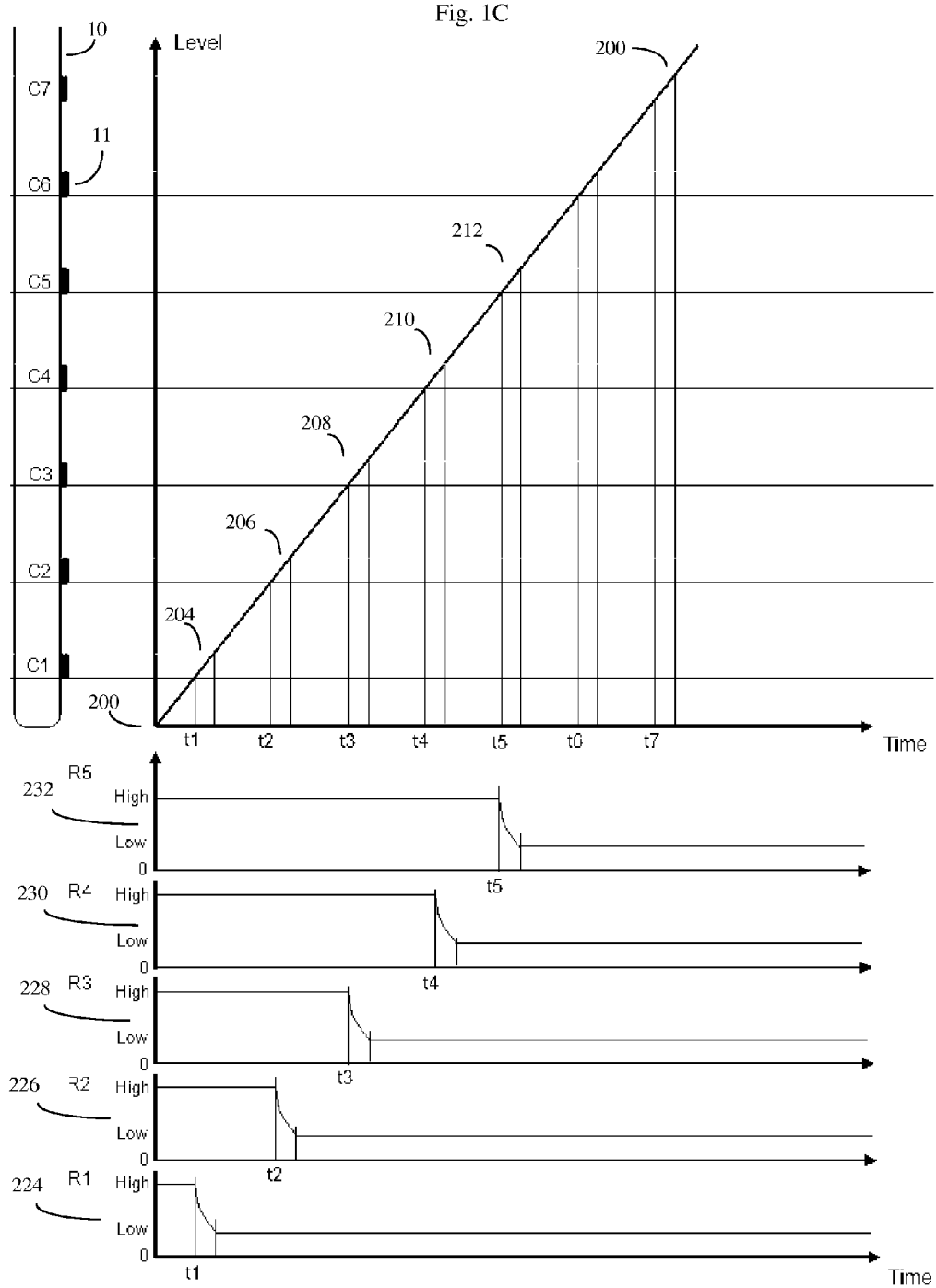

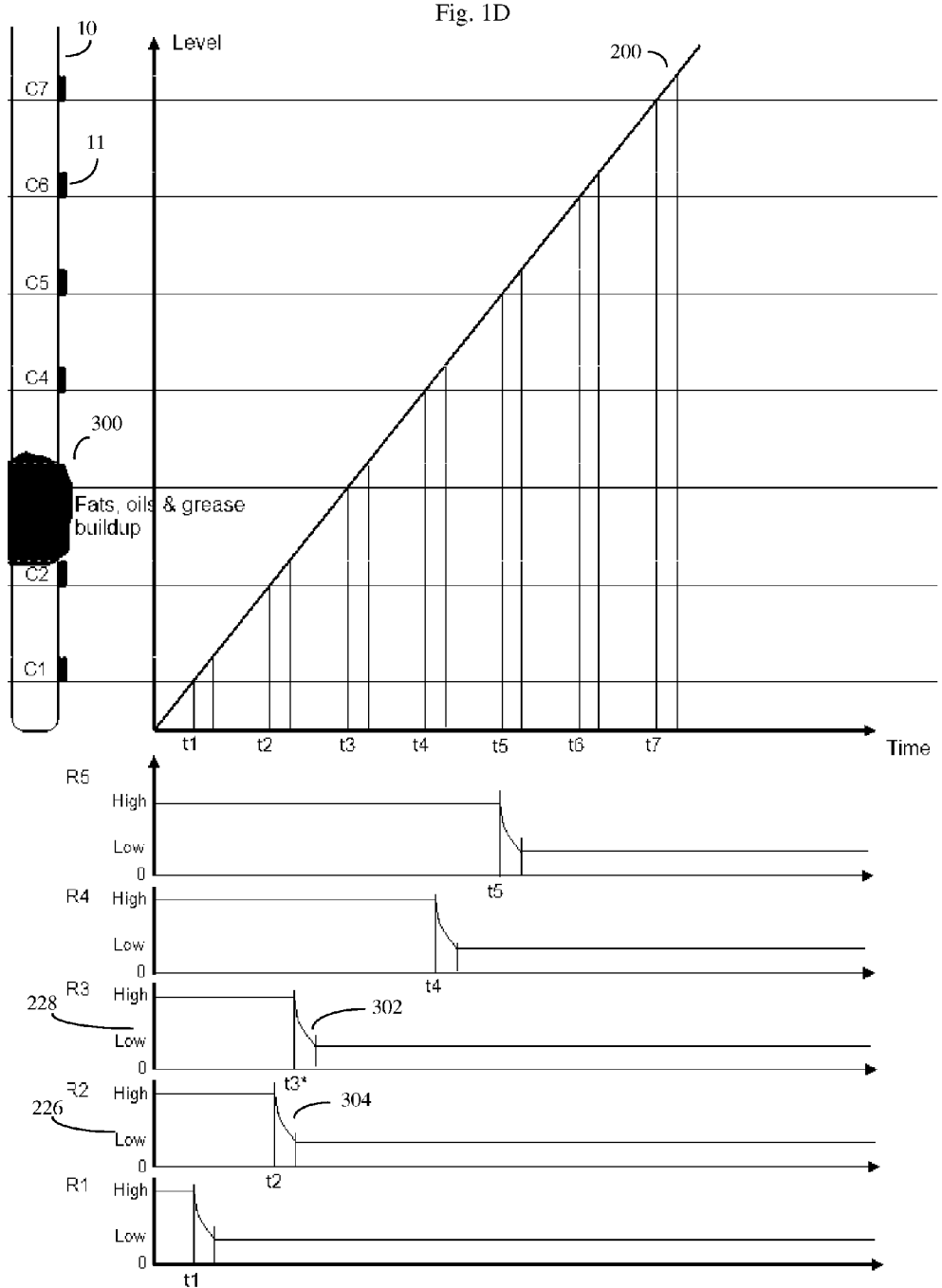

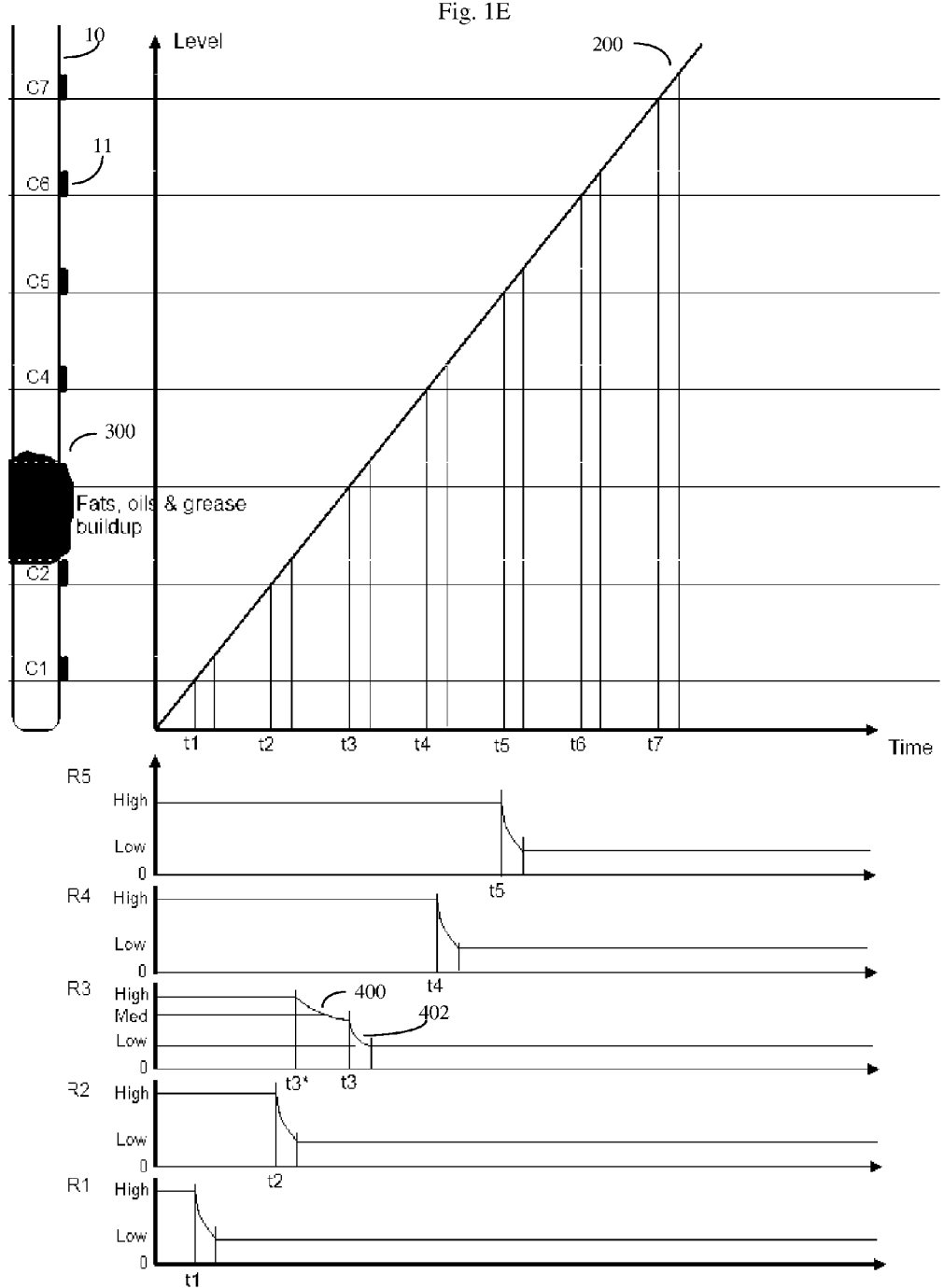

METHOD OF CORRECTING FOR CONTAMINANT DISTORTION OF ELECTRICAL WASTEWATER LEVEL SENSORS

CROSS REFERENCE TO RELATED APPLICATIONS

This application is a continuation-in-part of patent application Ser. No. 13/031,211, "Method and Apparatus for Waste Water Level Indication", filed Feb. 19, 2011, inventor Stephen Carson-Rowland; application Ser. No. 13/031,211 in turn claimed the priority benefit of provisional patent application 61/305,984, also entitled "Method and Apparatus for Waste Water Level Indication" filed 19 Feb. 2010, inventor Stephen Carson-Rowland; the disclosures of which are both incorporated herein by reference.

FIELD OF THE INVENTION

This invention relates broadly to wastewater level sensors, and more specifically to methods to correct electrode based wastewater liquid level and other types of liquid sensors for inaccuracies and distortions caused by contaminant build-up and other problems.

BACKGROUND OF THE INVENTION

Wastewater is generated from common sources, such as homes, schools, restaurants, hotels, office buildings, and the like. From these sources, wastewater enters a collection system and is gravity fed downstream through underground sewer pipes to a municipal treatment plant where the wastewater is chemically and biologically treated for return to the environment. Collection basins containing one or more wastewater pumps are located in areas of low elevation between the sources of wastewater and the treatment plant.

A pump station is generally constructed of concrete or fiberglass, and is a well or container that holds the wastewater liquid, and is typically between four to twelve feet in diameter, and can range from four to over forty feet deep. The pump station receives the flow of wastewater from the gravity sewer pipes that feed it. The pump station also houses one or more discharge pumps that serve to "push" the wastewater to another high point, or directly to the treatment plant. Depending on the plant location, multiple pump stations may be required to transport the wastewater to its final destination for treatment.

Each pump station has some means of signaling when the discharge pumps should turn "on" and "off" depending on the level of wastewater in the basin. Most commonly, this signaling means comprises various float switches staggered at different elevations in the basin, well, or container. These floats are wired back to a central control panel that houses the motor starters for the pumps. Depending on which of the floats "tips" determines which of the pump motors energizes, when it "de-energizes", and when there is a "high water" or "low water" condition.

Wastewater entering these pump stations typically conveys many contaminants along with the water—in particular, fats, oils and grease (FOG). As wastewater stored in the pump station well or container becomes stagnant, most of this FOG or FOG contaminants rises to the surface and solidifies. This FOG tends to collect on, and build-up around, anything it touches. It is particularly common for grease to collect on the aforementioned floats that control the operation of the pumps. When grease collects on a float, it can weigh the float down or hold it in one position. By not allowing the float to "tip," operation of the associated electrical switch is restricted, which in turn, affects automatic operation of the pump. Also, grease may "bridge" from a float to a pipe or other structure in the pump station, and the float may "stick" in the "up" position. When this happens, the pump motor never gets its signal to turn off, and continues to run even after there is no wastewater remaining in the basin, well, or container. In this event, the motor overheats causing substantial and costly mechanical damage to the pump.

Other prior art methods of wastewater level measurement include the measurement of electrical conductivity, as water is a conductive liquid. One prior art method of conductivity utilizes a rod, often formed from a non-conductive base material such as plastic, having a plurality of metal contacts (e.g. electrodes) on the rod. This rod is submerged in the pump station wastewater container or well, often near the bottom of the container. Each rod electrical contact (electrode) is connected to a unit in a control panel or other level computing device (which in some embodiments may be a microprocessor and software controlled wastewater level computing device). The control panel or other wastewater level computing device often applies a low AC voltage to each contact or electrode, and checks each electrode for a current to ground (or to another separate reference electrode, which again may be a ground). Here the criterion is that this current must be above a certain user-defined threshold in order for the system to register that the water is at that particular electrode level. Thus, the wastewater level (e.g. liquid level) in the well can be determined depending on the number of and position contacts allowing current to flow to ground.

As can be appreciated, when FOG and other waste material builds up on the rod, the waste materials can form an imperfect electrical seal and or water bridge that can cover and bridge one or more of the metal contacts (electrodes). The FOG waste material bridge or FOG contaminant can throw off the electrode readings. For example, the FOG material can act as a water bridge that serves to retain liquid, and thus enables a false electrical connection between the metal contact and the reference electrode ground to occur even when the water level is low. Alternatively, after the water level has dropped and the bridge has somewhat dried out, capillary action by the FOG contaminant bridge may wick liquid up from rising wastewater up through the waste material. In either of these cases, once the liquid in the well has risen up to the bottom of the waste material bridge, an electrical path capable of conducting the electrical measurement current will be created between ground and all of the metal contacts or electrodes that the FOG waste material has formed over. So the electronic unit may detect a false level—for example it may generate a reading that is higher than the actual wastewater level.

Therefore, when a lower electrical contact electrode on a FOG contaminant covered rod contacts liquid, the FOG bridge also provides an electrical path to a higher contact. This condition produces a false reading and "short cycling" of the pumps in that a wastewater pump will begin operation sooner than it normally would. The result is that the wastewater pumps cycle on and off more frequently than needed, leading to both short-term and long-term pump problems.

A similar problem occurs with the conductivity device as FOG builds up on the rod, especially around the contact or electrode which corresponds to the pump starting. This is because this level is the usually highest wastewater liquid level that is usually reached in the pump station. As the FOG or FOG contaminants are non-conductive, it can prevent an electrical current from flowing even when the liquid level reaches the same level as this contact. In this case, the level will keep rising until a higher contact is reached, but the same problem will eventually occur on this higher contact. In this scenario, the pump motor may not activate to transfer the rising wastewater from the pump station further downstream towards the treatment plant. As a result, the pump station may go into an "alarm" state, and can overflow onto the ground around the well, and into a nearby creek or stream.

To prevent these problems, the conductivity based wastewater level measuring devices should be cleaned with some frequency. Unfortunately, with existing devices, there is often no clear indication whether or not cleaning is required. Conversely, sometimes a large FOG buildup has no detrimental on the system operation, and as a result, the operators often may end up cleaning the rod when it is not required.

Another shortfall of prior art conductivity devices, and of floats, is that the liquid level value is usually measured in steps. For example, for a conductivity based level determination device with ten electrodes, there are at most only ten liquid level "steps" that can be measured.

Here the problem is that it is standard practice to make the liquid level determination rod only a small fraction of the height of the entire well, and to place such liquid level determination rods in the bottom half or bottom third of the well. This is done because this is where the pumps are ideally started and stopped. Unfortunately, once the water level progresses above the highest contact on the comparatively short rod, there is no way of knowing exactly what the wastewater liquid level is rising to in the pump station well or container.

This is a particular problem in high wastewater level conditions. The problem is exacerbated because often sewage treatment plants have multiple such pumping stations, and if the current wastewater management situation has caused one well/pumping station to nearly overflow, in fact often multiple such wells/pumping stations may be about to overflow, or otherwise be in an undesirable high wastewater liquid level condition. To cope with this problem, the operators need to know which station is most likely to overflow first. Here, prior art conducting rod measurement devices usually are not helpful, because they don't tell how high above the highest electrical contact on the rod the wastewater has risen.

Still another problem occurs when prior art, step-electrical contact, measuring rods are used to generate wastewater levels for variable speed drive (known as VSD or VFD) stations. These stations, which are becoming more common, typically work better when the liquid level is known with more detail—e.g. when the level of the wastewater in between the various electrical contacts, and past the range of the highest rod contact, is known. VFDs do not work well with discontinuous "process variables" such as stepped (discontinuous) liquid level readings.

BRIEF SUMMARY OF THE INVENTION

The invention is based, in part, on the insight that the utility of prior art electrical contact based wastewater liquid level measuring devices, such as electrical contact measuring rods, could be significantly enhanced if signal correction methods could be devised to better cope with the electrical signal distortions caused by FOG contaminant build-up on the measuring electrodes.

The invention is further based, in part, on the insight that the build-up of FOG contaminants on the electrodes of various electrodes of liquid level measuring devices, such as measuring rods, distorts the electrical signals in various predictable ways. Thus by using knowledge of these predictable electrical signal distortions, the accuracy of electrode based liquid level indicators can be improved.

The invention is further based, in part, on the insight that the accuracy of electrical contact measuring rods and other electrical contact based measuring devices can be still further improved by additionally taking into account the characteristic changes in electrical signals that occur as the liquid levels submerge the electrical contact ever deeper in the liquid container. By using knowledge of these characteristic electrical signal distortions, the ability to discern liquid levels at a higher degree of accuracy may also be obtained, even when the liquid level has risen past the level of the electrical contact or electrode in question.

Thus in one embodiment, the invention may be a computer or other electronic circuit implemented method to correct the readings from electrode based liquid level sensors from inaccuracies and distortions caused by FOG contaminant build up on the measuring electrodes. The method can also improve accuracy by detecting when such FOG contaminants are distorting the electrode based liquid level signals to the point where such signals are becoming seriously inaccurate.

In another embodiment, the invention may be a computer or other electronic circuit implemented method to improve the accuracy of such electrode based liquid level sensors by detecting changes in how the electrical signals from the sensor's electrodes to a reference electrode or ground change as the liquid levels progress ever higher above the level of the measuring electrode of interest. This allows the range of the measuring device to be improved, as well as the accuracy of the device to give readings that fall in-between adjacent electrodes.

BRIEF DESCRIPTION OF THE DRAWINGS

FIG. 1C shows how a plot of electrical resistance versus time looks for various electrical contacts on a liquid level indication rod as a wastewater container fills up with fluid, assuming that there are no FOG contaminants to distort the electrical signals.

FIG. 1D shows how FOG contaminants build up on an electrical contact (here electrode C3) can create a water bridge that distorts the various plots of electrical resistance versus time as a wastewater container fills up with fluid, here causing a premature drop in resistance at the C3 electrode.

FIG. 1E shows how FOG contaminants on an electrical contact (again electrode C3); in addition to causing a premature resistance drop, can also cause a multiple-step resistance drop. Here a first high-resistance electrical contact caused by the FOG contaminant water bridge is followed by a subsequent lower-resistance electrical contact when the wastewater reaches the level of the C3 electrode.

DETAILED DESCRIPTION OF THE INVENTION

Figure 1A:
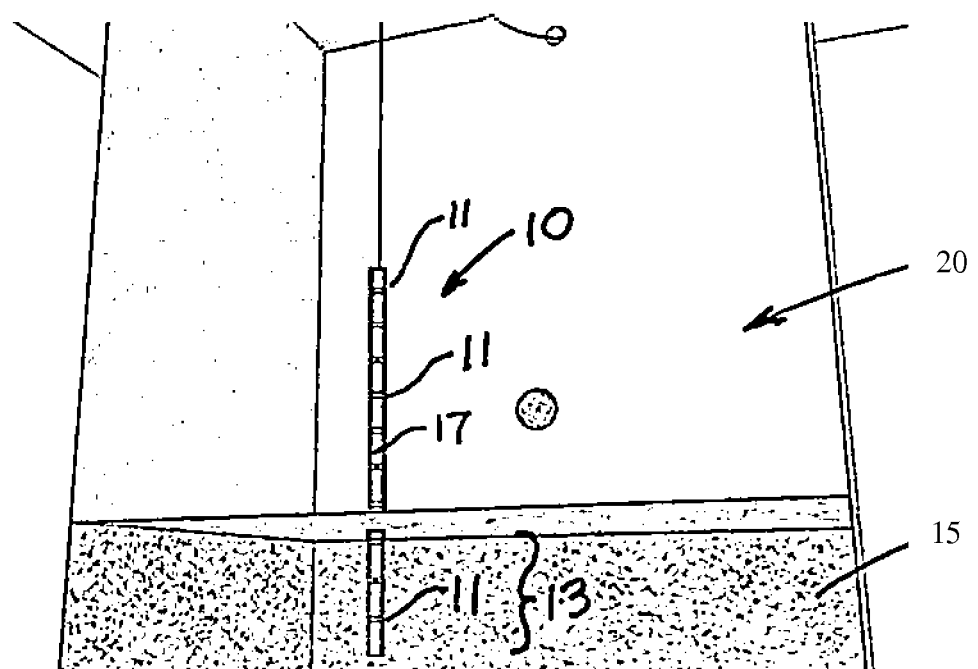
FIG. 1A is a diagrammatical illustration of a liquid level indication rod with electrical contacts, in accordance with the present invention. The liquid level indication rod is hanging in a wet well, with the bottom three electrical contacts under the surface of the liquid.

The methods of the present invention can be used to improve the accuracy of a variety of different types of electrode based liquid level indicators (liquid level measuring devices). In the more general embodiments, these liquid level measuring devices will usually have a non-conductive surface, often formed from a plastic material, that will have a plurality (often on the order of five, ten, or even more electrodes) of electrodes (electrical contacts) disposed on the non conducting surface so that the electrodes are suspended at different depths when the measuring device is placed in the liquid waste well or container.

Often, the liquid level indicator may be a liquid level indicator rod suitable for use with an electrical power source. This liquid level indication rod is generally intended to be at least partially immersed in the wastewater liquid. As previously discussed, this liquid level indication rod will have a plurality of electrical contacts (electrodes) disposed on a surface of a non-conductive material. Additionally, the liquid level indicator system will usually have an electronic level indicator transmitter in electrical communication with the liquid level indication rod, and with the electrical power source. This level indicator transmitter will function to measure current flow from each of the plurality of contacts to a separate reference electrode or ground in the liquid. This allows the system to determine which of the various electrical contacts (electrodes) lie beneath the surface of the liquid.

Often, this liquid level indicator will in turn function as part of a wastewater management system, comprising a wet well (container) for collecting and holding wastewater, a wastewater pump disposed in the wet well, and the previously discussed liquid level indication rod including this plurality of electrical contacts disposed on a surface of a non-conductive material.

The liquid level indication rod will be disposed in the wastewater, usually near the bottom of the well. Often an electrical control system, which may be a computerized electrical control system with at least one computer processor (microprocessor), software, and other ancillary equipment will be used to both monitor the status of the liquid level indication rod, as well as to control the operation of pumps, recording devices, alarms, and the like. This electrical control system may, for example, reside in a control panel that includes this control electronics. This electronics in turn is in electrical communication with the liquid level indication rod. Thus the electrical control system/control panel functions to measure various electrical current values between at least one electrical contact and a ground point, to for example provide a signal to the pump. As a specific example, if the electrode sensors show that the water level is too high, then the control system may turn on the pump and lower the level of wastewater liquid in the well or container. Once this liquid level drops to a lower acceptable level, the control system may then turn the pump off.

As previously discussed, however, the build-up of FOG contaminants can frustrate this control process, leading to situations where pumps may continue to operate when the pump runs dry, causing damage to the pumps. In the opposite direction, because the liquid level sensing devices are often placed near the bottom of the well or container, in the event that the liquid level gets too high, the pump may be in danger of overflow, yet the operator may not get accurate signals warning of this danger. Thus improved electrical control system methods to properly interpret the electrode signals in various situations, such as the previously discussed high FOG contaminant and overflow situations are desirable.

Thus in one embodiment, the invention may be a method of improving the accuracy of an electrode based liquid level indicator intended to operate in a fat, oil, grease and other waste (FOG contaminant) wastewater environment. As previously discussed, this electrode based liquid level indicator will generally comprise a liquid level measuring device intended to be at least partially immersed in a liquid waste container, such as a wastewater well. This liquid level measuring device will generally comprising a non-conductive surface, which may be a rod shaped surface, with a plurality of electrodes disposed on the surface. Often each electrode will be at a different location or height along the rod or other shaped object, so that when the measuring device is immersed in the liquid waste container, the various electrodes will be suspended at different depths in the liquid waste container.

As previously discussed, the problem to be solved is the problem that in the absence of FOG contaminants, the level of the liquid in said liquid waste container is measured by correlating the electrical interactions between said plurality of electrodes and an electrical reference (ground) in the liquid. However in the presence of FOG contaminants, the FOG contaminants tend to adhere to the electrodes of the measuring device and distort these electrical interactions, thereby causing inaccuracy in the fluid level measurement.

The invention's system and method is based upon the concept of using information on the distorting effect of these FOG contaminants on these electrical interactions to construct a FOG effect algorithm. Then, further obtaining at least one measurement of the electrical interactions between the various measuring device electrodes and liquid, usually by way of a differently located reference electrode or ground in the liquid. The invention's method then uses the previously determined FOG effect algorithm to correct for the distorting effect of this FOG contaminant on these electrical interactions, thereby producing FOG corrected measurements, and improving the accuracy of the electrode based liquid level indicator. Often this method will be implemented using one or more microprocessors and software, but the method may also be implemented on various types of non-microprocessor based electrical circuits (e.g. relay circuits, analog control circuits, and the like) as desired. This electrical processing and control system will generally be referred to in the alternative as the liquid level indication system.

The invention's system and method has a number of practical uses. In addition to avoiding situations where the pump accidentally runs the well or container dry, causing pump damage, the method can also detect when waste material buildup will lead to "short cycling", which is when a pump triggers too often, and can also potentially damage the pump. The method can also detect when FOG contaminants have built up to a point where the electrode measurements are so seriously distorted, that the results should be disregarded, and instead the measuring device should be cleaned.

FIG. 1A shows an exemplary embodiment of a liquid level indication rod (10), here having ten circumferential bands functioning as electrical contacts (11). The electrical contacts are disposed about a non-conductive material (17), that may be fabricated from polyvinyl chloride (PVC) or other high-density plastic. The non-conductive material (17) is preferably configured as a substantially cylindrical rod. The electrical contacts (11) may be fabricated from a corrosion-resistant, high-grade metal. In a typical application, the liquid level indication rod (10) is suspended in a wet well (20), with a portion of the liquid level indication rod (10) having one or more electrical contacts (13) under water, in accordance with an aspect of the present invention.

A liquid level signal processing and control system, also referred to as a liquid indication system (shown in FIG. 6) may be provided to test for current flow, or resistance, between each submerged electrical contact (11) to a grounded component or to earth ground. This current flow, or resistance, is dependent on a number of factors. These factors include: the surface area of the electrical contact (11) (i.e., the width and circumferential length), the material forming the electrical contact, the size and composition of the grounded component, the inherent conductivity of the wastewater in the wet well or container (20), herein referred to as liquid (15), and the electrical conductivity of the liquid (15). Effectively, electric current flows through multiple somewhat parallel liquid paths from the electrical contacts (11) to the grounded component or to earth ground.

Figure 1B:
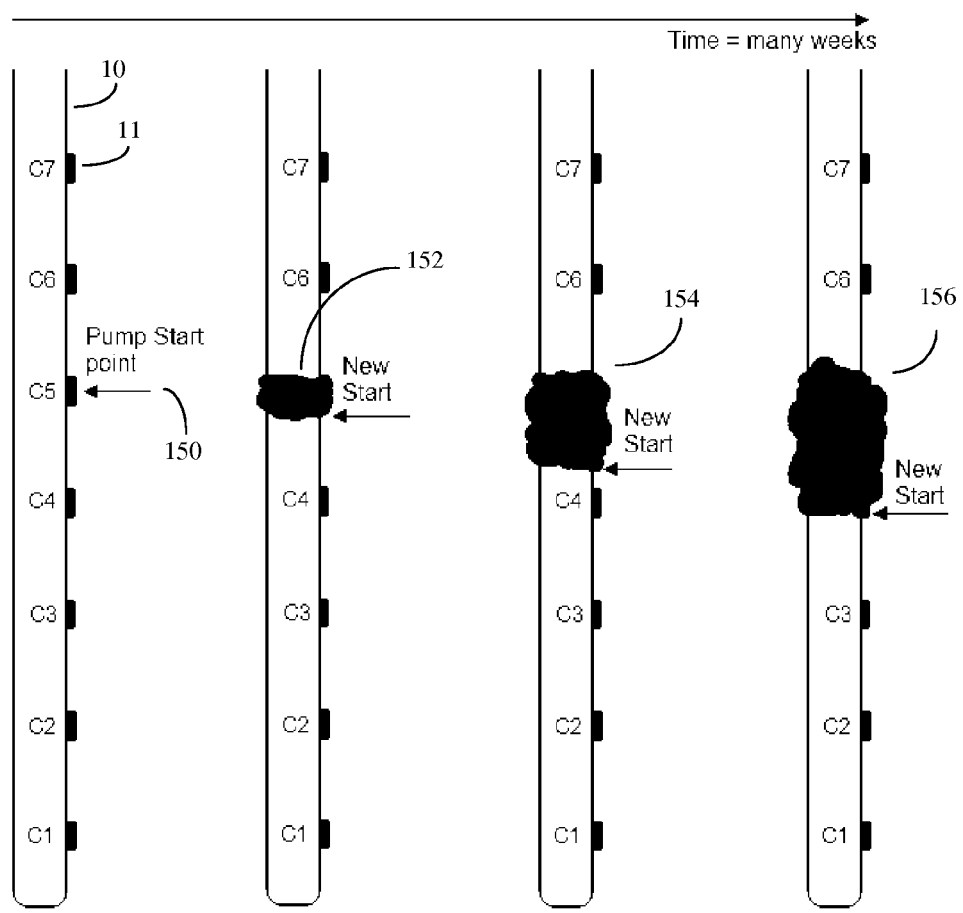
FIG. 1B shows how FOG contaminants can build up on pump electrical contacts over time, forming a water bridge that eventually bridges adjacent electrical contacts.

FIG. 1B shows how FOG (156) contaminants can build up on pump electrical contacts over time, forming a water bridge that eventually bridges adjacent electrical contacts. FIG. 1B shows a close-up of the liquid level indication rod (10) and its various electrical contacts or electrodes (11), here termed C1 to C7. Here C1 is at the deepest part of the well or container, C7 is above the normal or ideal liquid level, and the electrical control system is operating the pumps with the goal of maintaining the liquid level at about the level of the C5 electrode (150). Thus if the liquid level drops below the C5 level, the pump will turn on (pump start point 150) and drain the well or container, and if the liquid level rises much above the C5 level, the pump will turn off and allow the liquid to accumulate in the well or container. Since the FOG contaminants tend to float to the surface of the liquid, what happens is that over time, Fog contaminants (152), (154), (156) gradually build up at the C5 electrode, and eventually form a fluid or water bridge with the lower C4 electrode. The FOG contaminants act to wick the fluid up to the level of the C5 contact, so with time, the pump starts keeping the water level in the well or container at a lower and lower level.

FIG. 1C shows how a plot or graph of electrical resistance versus time looks for various electrical contacts or electrodes (again C1 . . . C7) (11) on a liquid level indication rod (10) as the well or wastewater container fills up with fluid. Here assume that there are no FOG contaminants to distort the electrical signals. In this diagram, assume that the well or container (20) is initially empty at time zero, and then is filling up at an even rate. The line (200) on the fluid level versus time graph (202) shows this steady increase in fluid level. Note that at time t1 (204), the fluid is at the level of the C1 electrode, at time t2 (206), the fluid is at the level of the C2 electrode, at time t3, the fluid is at the level of the C3 electrode (208), at time t4 (210), the fluid is at the level of the C4 electrode, and at time t5 (212) the fluid is at the level of the C5 electrode, and so on.

Note that in the absence of FOG contaminants (i.e. clean electrodes), the various graphs showing the resistance of the various electrodes C1 . . . C5 as a function of time and the raising fluid level will all show the same characteristic resistance drop when the fluid level in the container rises to the level of that particular electrode. For example, graph (224), which follows the resistance measurement versus time from the C1 electrode shows a sharp resistance drop at time t1, graph (226) which follows C2 shows the same type drop at time t2, graph (228) which follows C3 shows the same type drop at time t3, graph (230) which follows C4 shows the same type drop at time t4, and graph 232 which follows C5 shows the same type drop at time t5.

FIG. 1D shows how FOG contaminants (300) that build up on an electrical contact (here electrode C3) can create a water bridge that distorts the various plots of electrical resistance versus time as a wastewater container fills up with fluid, here causing a premature drop in resistance at the C3 electrode. Note that in contrast to FIG. 1C, when the resistance versus time graph of the C3 electrode (228) is compared with the resistance versus time graph of the C2 electrode (226), here the C3 resistance drop (302) occurs almost immediately after the C2 resistance drop (304), even though when looking at the water level versus time line (200), it can be seen that the water level has not yet reached the level of the C3 electrode.

FIG. 1E shows how FOG contaminants (300) on an electrical contact (again electrode C3), in addition to causing a premature resistance drop, can also cause a multiple-step resistance drop. Here a first high-resistance electrical contact (400) caused by the FOG contaminant water bridge (300) is followed by a subsequent lower-resistance electrical contact (402) when the wastewater reaches the level of the C3 electrode.

Thus, following the example from FIG. 1D, this information on how FOG contaminants affect the various electrode timing measurements can be used to construct a FOG effect algorithm. In this example, the algorithm would keep track of the comparative resistance versus time measurements for the various electrodes, and would flag when the distorting effect of the FOG contaminant on the electrical interactions between a plurality of electrodes and the liquid is such that at a FOG partial water bridge is formed between at least two adjacent electrodes on the liquid measuring device. Here one adjacent electrode would be an upper electrode mounted on a higher level in the measuring device (e.g. C3 on rod (10)), and one adjacent electrode would be a lower electrode mounted on a lower level in said measuring device (e.g. C2 on rod (10). Here, when the lower electrode (e.g. C2) and the upper electrode (e.g. C3) are initially dry, and the liquid level in the container (20) rises (e.g. line 200) to make electrical contact with the lower electrode (e.g. C2) at a first time, the FOG partial water bridge causes the upper electrode (e.g. C3) to make premature electrical contact with said liquid at the later time even though the liquid is not at the level of said upper electrode. Here the FOG effect algorithm can determine if the difference time between the two measurements is within one or more FOG partial water bridge time parameters and if so generate a FOG alarm signal and/or correct the measurement for the presence of FOG contaminants. Here, for example, the bad C3 signal could be ignored, and a corrected C3 time obtained by linear interpolation from the C1 and C2 measurements, or other correction method could be used.

Stated alternatively, the method and system may function to alert operators to the buildup of contaminants on the rod. In an exemplary embodiment, the method and system may measure the time interval between any two contacts registering a level. If the time so measured is less than a predetermined value, the alarm may be activated.

Alternatively or additionally, following the example from FIG. 1E, this information on how FOG contaminants affect the shape of the resistance measurements versus time can also be used to construct an alternative FOG effect algorithm. In this alternative FOG effect algorithm, the distorting effect of the FOG contaminant on the electrical interactions between the various electrodes and the liquid is such that at least a FOG partial water bridge is formed between at least two adjacent electrodes (e.g. C2, C3) on the liquid measuring device. Here again, one adjacent electrode (e.g. C3) can be an upper electrode mounted on a higher level on the measuring device (10), and one adjacent electrode (e.g. C2) can be a lower electrode mounted on a lower level on the measuring device (10). In this alternative approach, when the lower electrode and the upper electrode (e.g. C2, C3) are initially dry, and the liquid level (200) in the container (20) rises to make electrical contact with the lower electrode (e.g. C2 at time t2) at a first time, the FOG partial water bridge (300) causes the upper electrode (e.g. C3) to make a premature high resistance electrical contact $R_{fog}$ at a second slightly later time (400) (e.g. time t3") that is too soon, because the liquid is not really at the level of the upper electrode (C3) yet, and then at a still later time (e.g. time t3 (402)), the electrode will make a normal resistance electrical contact $R_{normal}$ with the liquid when the liquid really reaches the level of the upper electrode (here C3 at time t3).

Thus in this example, the FOG effect algorithm can be used to determine if the upper electrode electrical contact (e.g. C3 at a time between t3" and t3" (400)) is within at least one $R_{fog}$ parameter, and if so generate a FOG alarm signal and/or correct the measurement for the presence of FOG contaminants.

Figure 1F:
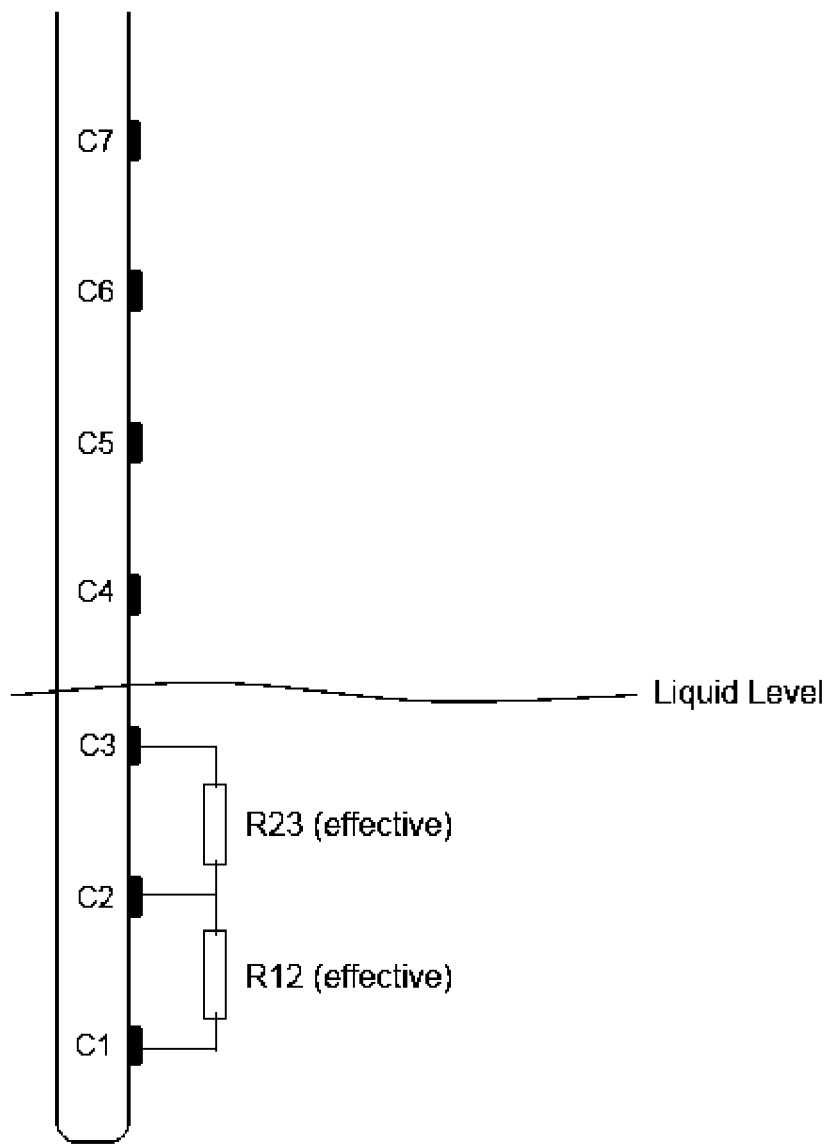
FIG. 1F shows an alternate embodiment where one of the electrical contacts (electrodes) on the liquid indication rod can be used as the reference electrode.

Although generally, the reference electrode or ground used for the various electrical measurements is separate from the measuring rod or other measuring device, this does not always have to be the case. FIG. 1F shows an alternate embodiment where one or more of the electrical contacts (electrodes) on the liquid indication rod can be used as the reference electrode. In this case, the measured resistance or electrical current is thus between the various electrodes on the device.

Alternative Approaches

As previous discussed, in another embodiment of the invention, differences in the characteristic electrode electrical signals can also be used to distinguish at least approximately how high the wastewater is above a given electrode or electrical contact of interest.

Figure 2:
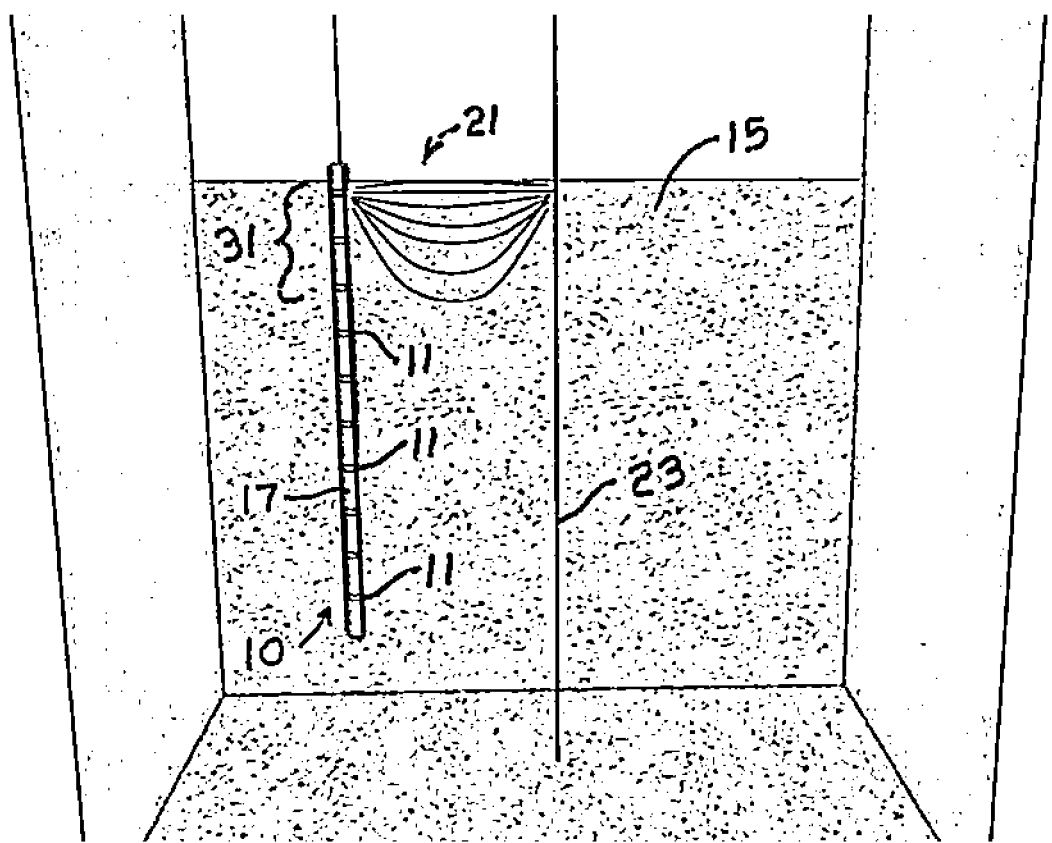
FIG. 2 is a diagrammatical illustration of the liquid level indication rod of FIG. 1A extending slightly from the well water, the illustration showing a set of lines representing an electric field emanating from the topmost rod contact to a reference electrode or "ground," as current flows from the liquid level indication rod to a ground rod through the water in the well.

To see the background for this alternative embodiment, consider FIG. 2, in which a set of lines (21) represent an electric current or field (31) emanating from the topmost electrical contact or electrode (11) to a separate reference electrode or ground (23). Here the current flows through the liquid (15) from one electrical contact (11), to the grounded reference electrode component. (23) In an exemplary embodiment, the grounded component may comprise a ground rod (23), such as a chain, a metal pipe, or a metal ladder suspended in the container or wet well (20). The electric current or field (21), here represented by multiple paths extending between the topmost electrical contact (11) lying under the liquid (15) and the ground rod (23), can be envisaged to be a bit like the magnetic field between two poles. It should be understood that each of the other electrical contacts (11) disposed on the portion of the liquid level indication rod (10) lying under the surface of the liquid (15) similarly has an electric current or field to the ground rod (23). Here the other electric fields are not shown in the figure for clarity of illustration.

Figure 3A:
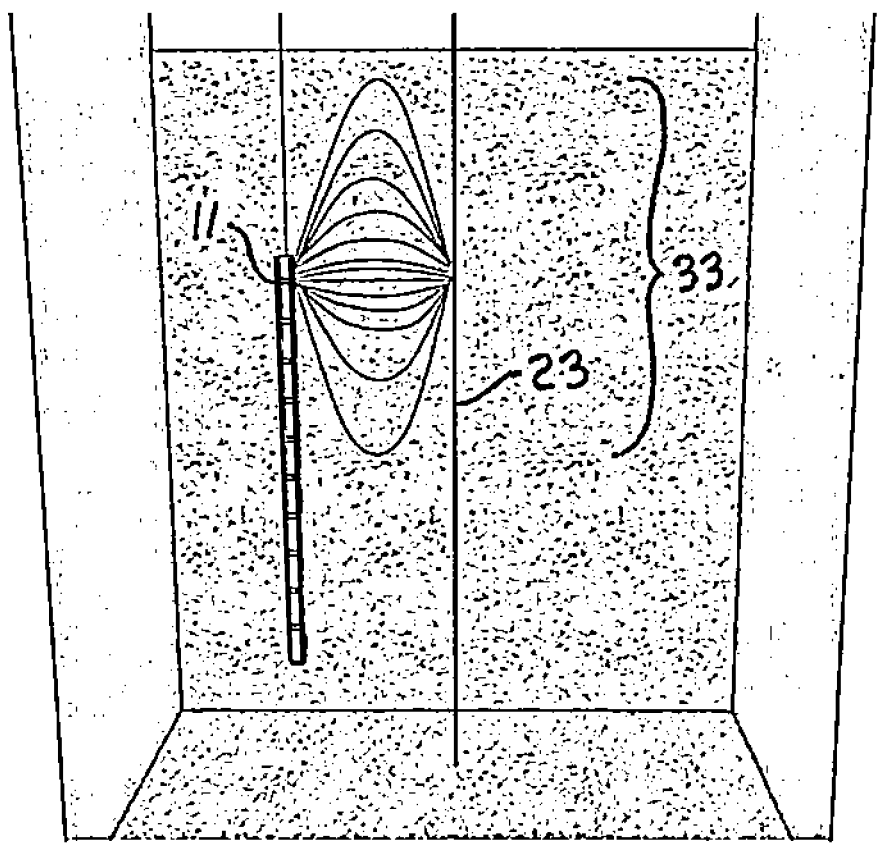
FIG. 3A is a diagrammatical illustration of the liquid level indication rod of FIG. 2 where the rod is more deeply submerged in the wet well water, the greater depth of the rod resulting in more electric field paths to the reference electrode or ground rod, reducing the effective resistance.

It can be appreciated that, as the level of the liquid (15) increases, as best seen in FIG. 3A, the electric current or field (21) of FIG. 2 has correspondingly grown in extent, here represented by an electric current or field (33) having an increased number of conductive paths extending between the top electrical contact (11) and the ground rod (23). The number of roughly parallel conductive paths in each of the other electric fields (not shown), that is, in the electric fields emanating from the other contacts (11) lying below the top contact (11) and the ground rod (23), are likewise increased. Consequently, the total resistance to the ground rod (23) is reduced, so long as the other variables are kept constant. This change in resistance, or corresponding increase in current flow, can then be used to remotely determine the level of the liquid (15) in the wet well (20) even though the level of the fluid 15 is at or above the level of the highest electrode or electrical contact 11.

In an "ideal case" the measured resistance would be similar to the resistance of a wire $$R=\rho L/A$$

where ρ is the resistivity of the wire material, A is the cross-sectional area of the wire, and L is the length of the wire. However, in the physical case of a large body of liquid surrounding a contact on the rod and a length of conductive material connected to the grounded component, determining resistance is not simple. The calculation of resistance can be done by using numerical analysis to solve Maxwell's field equations, but often experimental methods may be used as well.

In practice, the effect of the changes in water level above the level of any given electrode is twofold. One effect is that there is a small, but measurable, change in resistance. A second effect is that because, as can be seen in FIG. 3A, the electrical current lines or field lines (31), on the average, traverse longer path lengths than the electrical current lines or field lines (21) when the water level is not so high. Because the passage of electricity through water is mostly mediated by ion transport, the net effect of the average longer path length is that although more electrical current (e.g. lower resistance) will pass at higher liquid levels, the delay time in the time needed for this current to pass will be somewhat greater. Put alternately, a sharp change in the electrical signal from electrode (11) will take slightly longer to propagate through the liquid medium (15) in the FIG. 3A higher water level case (31), then it will in the FIG. 2 lower water level case (21). This longer propagation time can be detected as either a slight phase shift in an alternating current AC signal, or alternatively can be detected as a higher amount of dispersion in the signal when a very sharp electrical pulse, similar to a Dirac delta signal or square wave signal, is applied to electrode (11).

At least for resistance measurements, variations in the properties of fluid (15) should ideally be compensated for. This is because the inherent conductivity of the liquid varies over time due to the changing composition of the liquid in the well, the fluctuations in water temperature. To compensate for this effect, in some embodiments, the conductivity of the liquid may be determined separately, using an optional set of conductivity contacts on an indication rod (see FIG. 7). Here the measured resistance value between a given contact and ground may be divided by the resistivity (i.e., alternatively, multiplied by the conductivity). In this manner, the effect of changing temperature or changing liquid composition can be cancelled out. Accordingly, the analog water level in the well can be reliably calculated by using both the actual resistance measurement and the conductivity measurement.

The resistance between an individual electrical contact (11) on the liquid level indication rod (10) and the ground rod (23) is a function of the surface area of the individual electrical contact (11). As the total surface area of the electrical contacts (11) that lie under the surface of the liquid (15) increases, the resistance to the ground rod (23) is reduced, the resistance being a non-linear function of the aggregate areas of the individual electrical contacts (11) lying under the liquid (15). Therefore, as the level of the liquid (15) rises from (a) the bottom of a particular electrical contact (11), that is, at the point where the liquid (15) is just touching the particular electrical contact (11), to (b) the point where the liquid (15) completely covers the particular electrical contact (11), the resistance measurement determined at the remote control system will decrease continuously or, alternatively, the value of the current flow will increase continuously.

Thus in an alternate embodiment of the invention, the invention may be a method to further determine approximately how high the level of the liquid is above any given electrode(s) that are submerged in the liquid. This alternate embodiment works by correlating the electrical interactions between the plurality of electrodes, an electrical reference, and the level of the liquid, thereby producing a liquid level height effect algorithm. The invention's method then uses this liquid height effect algorithm to determine approximately how high the liquid level is above any given electrode(s) that are submerged in the liquid.

In a first variant of this alternate embodiment, the liquid level height effect algorithm is at least partially based on the decrease in electrical resistance as a function of liquid level. In a second variant of this alternate embodiment, the liquid level height effect algorithm is at least partially based on the increase in electrical signal propagation time as a function of liquid level.

Regardless of how the liquid level height effect algorithm operates, these methods are useful both for wastewater measurement and control methods, as well as for general fluid measurement and control methods in general.

Figure 3B:
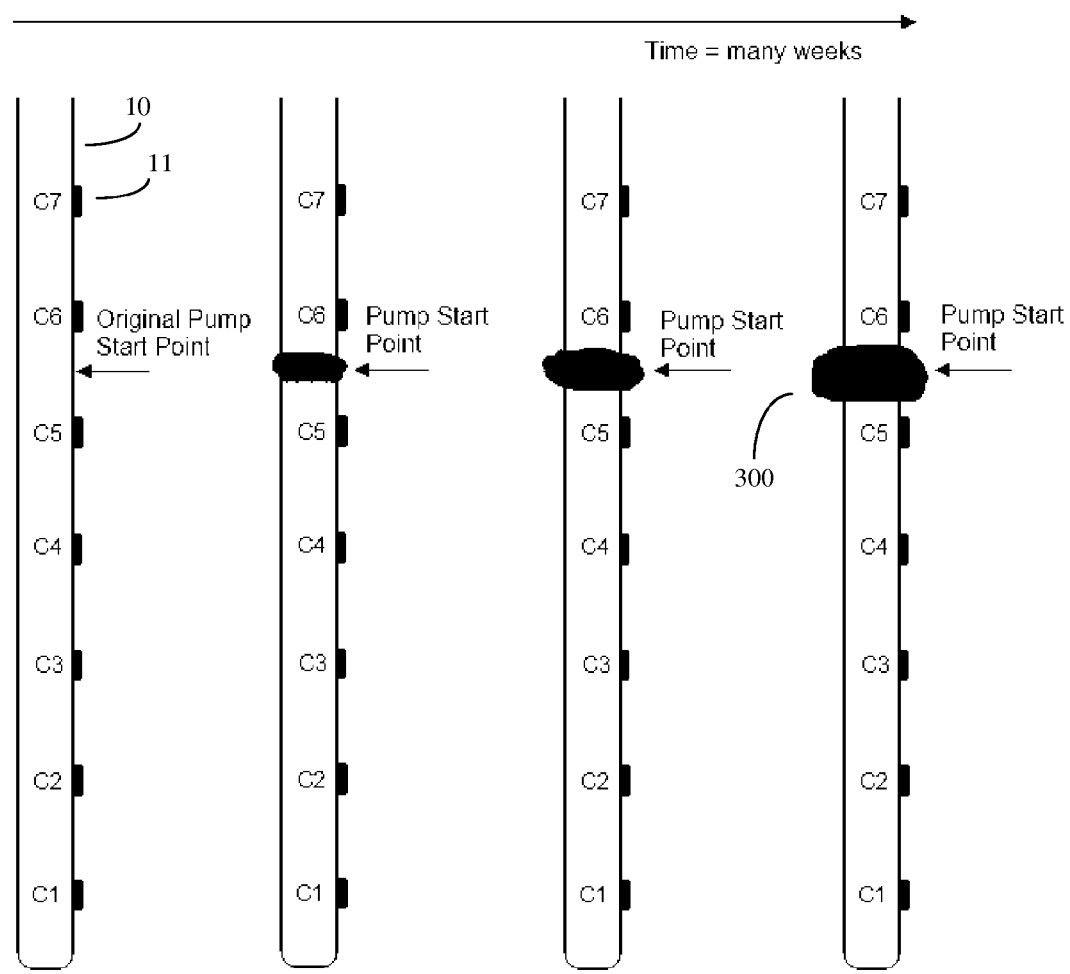
FIG. 3B shows how by utilizing the invention's method of determining how far above a given electrode the liquid level of the wastewater is, the system can be operated so as to direct FOG contaminants to build up to a non-conducting region on the measuring rod in-between the electrical contacts, thus further minimizing the liquid level signal distortions caused by FOG contaminant build-up.

As one application, consider FIG. 3B. Here the liquid level height effect algorithm may be used to determine when the liquid level is approximately midway between two adjacent electrodes (e.g. C5 and C6) on the liquid measuring device (10). Here one adjacent electrode (e.g. C6) is an upper electrode mounted on a higher level in the measuring device (10), and one adjacent electrode (e.g. C5) is a lower electrode mounted on a lower level in the measuring device (10). Here the method may be used to reduce the build-up of said FOG contaminants on at least the lower electrode. To do this, the wastewater level control system can be programmed or otherwise adjusted to try to always keep the level of the liquid in said container at a level that is approximately midway between any two adjacent electrodes. As FIG. 3B shows, this will preferentially directing any floating FOG contaminant build-up to the non-conducting region of the liquid measuring device in between the electrodes. This in turn will minimize FOG caused distortion in the measuring rod's electrical signals.

These methods are useful for other applications as well. For example, these types of liquid level height effect algorithms may also be used to determine when the liquid level is far enough above the level of the highest electrode in the liquid level measuring device. This can happen when the waste well (20) or container is at risk of overflowing. This type of determination can be particularly useful for commercial sewage treatment plants. Here, in emergency situations such as storms, operators must make rapid decisions to determine which of several wastewater wells or containers are in most urgent need of servicing, and then direct initial corrective actions to those wells. Here the invention can provide better information, and help in this decision process.

Figure 4:
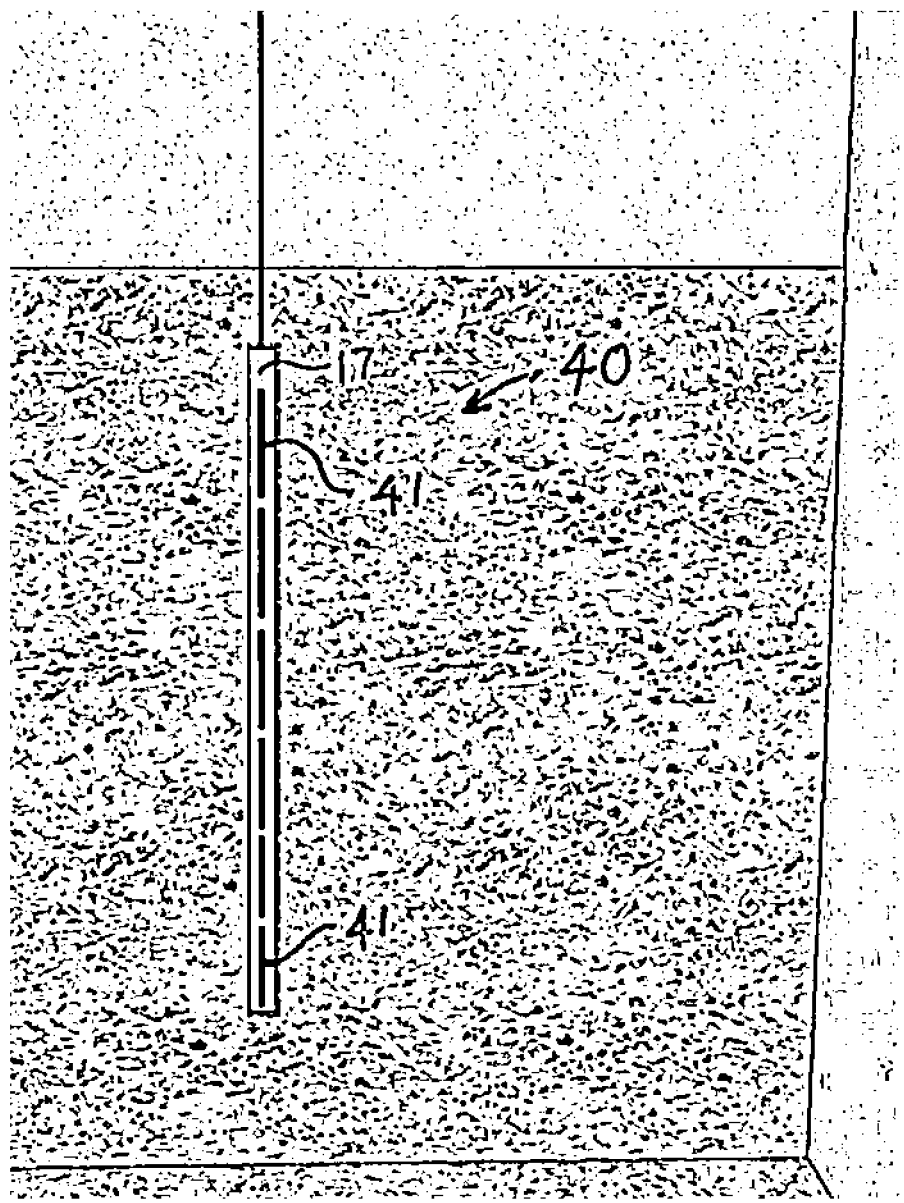
FIG. 4 is an alternative embodiment of a liquid level indication rod, wherein the liquid level indication rod includes multiple axial contacts.

In other embodiments, it may also be useful to further configure the shape of the liquid level measuring device, as well as the disposition of the various electrodes on this liquid level measuring device, to still further reduce the ill effects of FOG contaminant build-up. Here, for example, at least when the measuring device is substantially rod or pole shaped, the measuring device may additionally comprise a plurality of grooves in the rod or pole shaped surface. This plurality of grooves can be disposed adjacent to one or more contacts to mitigate waste material buildup. This is shown in FIG. 4.

In one aspect, the invention may thus be viewed as a method of signal processing electrical signals derived from electrode based wastewater level detection devices. The method improves the accuracy of such determinations, and this is greatly needed in the adverse environment frequently encountered in wastewater treatment plants.

As some more specific and concrete examples, in the following discussion, some very specific systems and methods of implementing the invention will be discussed. Note, however, that these very specific systems, apparatuses, and methods are not intended to be limiting.

Specific Examples

FIG. 4 shows an exemplary method of implementing this embodiment using a liquid level indication rod (40) comprising a plurality of linear, axial electrical contacts (41) disposed on the non-conductive material (17), so that the water level measurement can be a semi-continuous measurement. Depending on the particular manufacturing technique used, an alternative liquid level indication rod design may include one long axial contact. However, automatic calibration is preferably enabled by the use of multiple axial contacts. In yet another alternative exemplary embodiment (not shown), the axial contacts (41) may be staggered circumferentially about the surface of the liquid level indication rod (40) such that adjacent contacts (41) may be longitudinally positioned along the liquid level indication rod 40 so as to overlap along the length of the liquid level indication rod (40).

Figure 5:
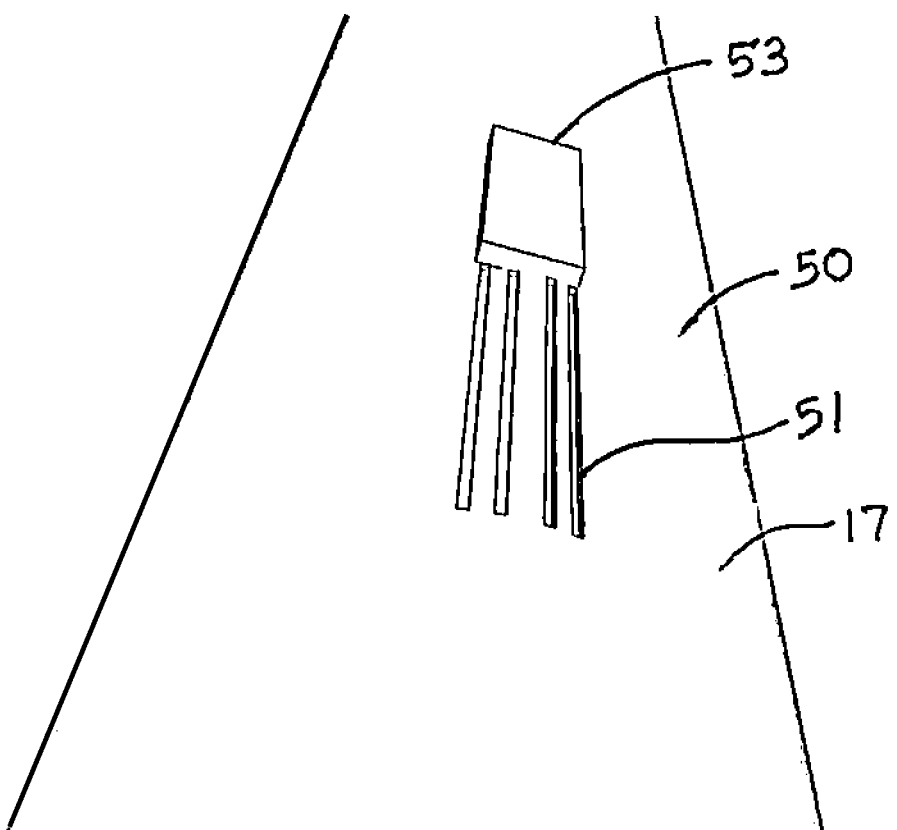
FIG. 5 is a diagrammatical illustration of a liquid level indication rod having grooves cut into the rod surface adjacent to a metal contact.

In another exemplary embodiment, a liquid level indication rod (50) may include one or more fine grooves (51) on the surface of the non-conductive material (17) to form a liquid level indication rod (50), as shown in FIG. 5. The fine grooves (51) may be disposed proximate the electrical contact (11) or (41), as described above. In an alternative exemplary embodiment, the fine grooves (51) may be disposed so as to terminate at a substantially rectangular metal contact (53), as shown in FIG. 5. This configuration makes it more difficult for fats, oils and greases to form a seal in the vicinity of the metal contact (53), while still allowing electric current to flow to the metal contact (53) in high FOG buildup situations. In the example provided, four grooves (51) are oriented in an axial, or longitudinal, direction, and cut into the rod surface adjacent to the metal contact (53). In an alternative exemplary embodiment (not shown), the grooves can be closed grooves orientated in a circumferential direction, or may be grooves disposed at an angle between the circumferential direction and the axial direction along the liquid level indication rod (50).

Note that prior art water-level systems based on electrical conductivity usually required the user to set a resistance (or conductivity) threshold. When the resistance between that contact and ground is below the threshold, the system would determine that the contact is wet. Although the novel methods of the present invention are also compatible with such operator set criteria, in some embodiments, according to the invention, the user is not required to select an appropriate threshold, or to have a user-defined threshold. Rather, the method may function by comparing the current flow through one contact with current flow through other contacts.

Figure 6:
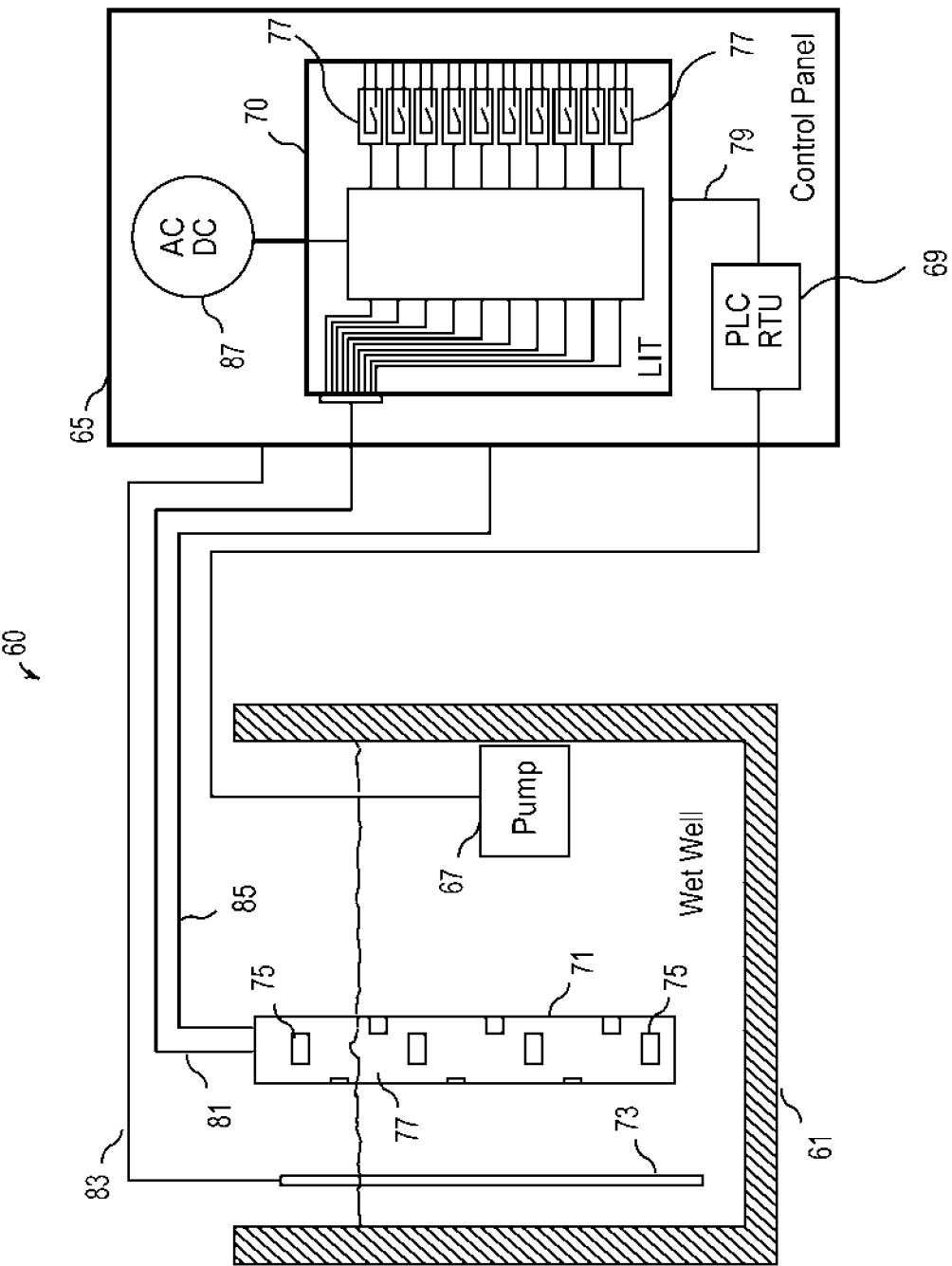
FIG. 6 is a diagrammatical system block diagram of a wastewater management system incorporating the liquid level indication rod and ground rod of FIG. 3, 4, or 5 in the wet well.

FIG. 6 shows an example of a wastewater management system (60), in accordance with an aspect of the present invention. This wastewater management system (60) includes a wet well (61) in which the level of a liquid (63) is maintained within a predetermined range by a control panel, often containing a microprocessor and associated software that are implementing the various methods described herein (65). A pump (67) is provided in the wet well (61) and controlled by a pump control unit (69), which control unit may be implemented as a programmable logic controller, microprocessor, or a remote telemetry unit, as is well known in the relevant art.

The pump control unit (69) functions to turn the pump (67) on and off, in accordance with signals provided to the pump control unit (69) by a level indicator transmitter (70). The level indicator transmitter (70) functions by sensing the level of the liquid (63) in the wet well (61) via a submersible water level indicator rod, such as the water level indicator rod (71) shown in the illustration.

In this example, the water level indicator rod (71) includes ten, spaced-apart electrical contacts or electrodes (75) disposed along the length of an electrically non-conductive rod (77). The individual electrical contacts (75) are each shorter than the circumference of the rod (77), and this allows for the plurality of electrical contacts (75) to be staggered at 120° intervals about the cylindrical surface of the rod (77). Alternatively, any of the liquid level indication rods (10), (40), and (50) can be used in place of the water level indicator rod (71). An electrical power source (87), which may be either AC or DC, supplies the current used by the level indicator transmitter (70) to determine which of the electrical contacts (75) are under the surface of the liquid (63).

Note that in some embodiments, it may be useful to position the electrodes on the underlying non-conductive support in such a manner that fibers in the wastewater, such as strands of wet paper, cannot easily cause inadvertent electrical shorts between adjacent electrodes. To do this, the electrodes may be spaced on the rod or other support in a manner so that one electrode is not placed immediately on top of the other electrode, but rather is displaced off to the side. This way a linear strand of waste material dangling from an upper electrode is less likely to produce an inadvertent short with a lower electrode. Here, for example, in the case where the underlying support structure is a rod, each electrode can, for example, be displaced by 120 degrees from the electrode below it. This sort of arrangement can be seen in FIG. 6 and also FIG. 7, where the different electrodes (75) are not placed immediately on top of each other, but rather are displaced along the underlying non-conductive support rod (77). Thus in a somewhat preferred embodiment, the electrodes are disposed on the non-conductive surface so that no electrode is placed directly above an adjacent electrode.

In an exemplary embodiment, the electrical power source (87) may provide low frequency (i.e., 50 to 400 Hz) electrical power of from about one to about thirty volts to enable the level indicator transmitter (70) to obtain reliable current measurements. Accordingly, the output from the level indicator transmitter (70) to the pump control unit (69) may comprise a current signal, such as from zero to 100 mA, or the level indicator transmitter (70) may provide 'relay open' and 'relay closed' signals to the pump control unit (69). In response, the pump control unit (69) may respond by powering the pump (67) when the current level exceeds a specified value, or may power the pump (67) when a particular relay has closed (or opened).

As can be appreciated by one skilled in the art, level indicator transmitter (70) and the water level indicator rod (10, 40, 50, 71) can be adapted for operation in a wastewater management system, as shown, or in any other system requiring an apparatus for sensing the level of a liquid in a container. There may also be provided a ground rod or reference electrode (73) suspended in the liquid (63), where the ground rod (73) may be grounded locally to the wet well (61), or may be electrically connected to and grounded at the control panel (65) by a ground wire (83), as shown.

An electrical indication wire bundle (81) may provide electrical paths between the level indicator transmitter (70) and each of the ten electrical contacts (75) disposed on the non-conductive material (77) in the liquid level indication rod (71). An extra, eleventh electrical wire (85) may be included with the wire bundle (81) as a 'fail safe' component to indicate a possible break in the indication wire bundle (81). The level indicator transmitter (70) may function to activate or to shut off the pump (67) by means of providing a pump signal to the pump control unit (69) via an optional pump signal line (79). The pump signal may be generated by the level indicator transmitter (70), in accordance with predetermined operational criteria, as explained in greater detail below.

In the example shown, the top two electrical contacts (75) remain out of the liquid (63), and the bottom eight electrical contacts (75) are under water. The level indicator transmitter (70) includes ten relays (77), where each of the relays (77) is electrically connected to a corresponding electrical contact (75) by a conductor in the electrical indication wire bundle (81). The relays (77) can be of an either 'normally closed' or 'normally open' configuration. In the example shown, the relays (77) are normally open, and the two top relays (77) have remained open, because the two corresponding electrical contacts (75) on the water level indicator rod (71) remain above the liquid (63). The eight lower relays (77) have closed, because the corresponding eight electrical contacts (75) remain in the liquid (63).

Figure 7:
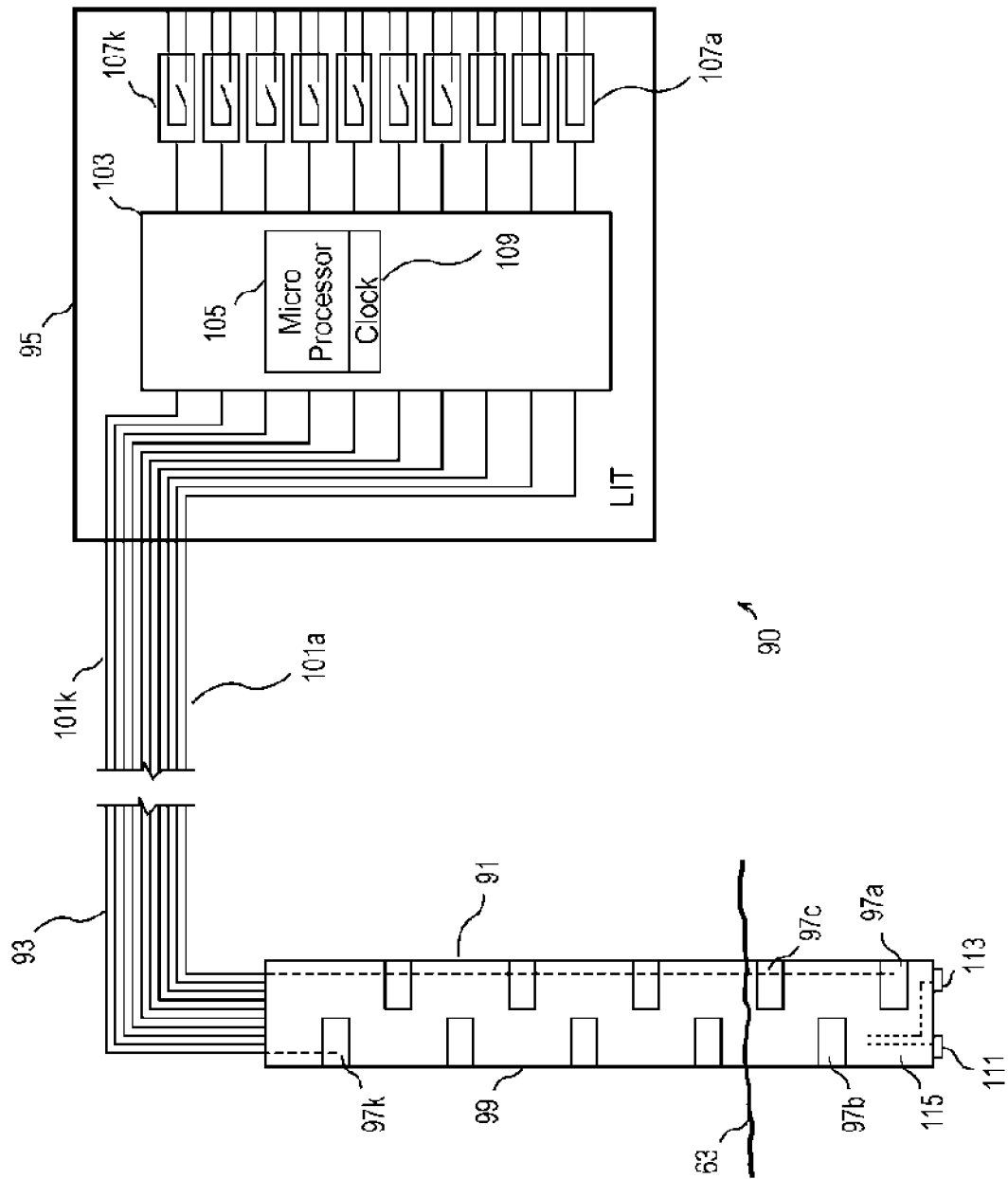
FIG. 7 is a diagrammatical block diagram of a liquid level indicator suitable for use in the wastewater management system of FIG. 6.

There is shown in FIG. 7 an alternative exemplary embodiment of a liquid level indicator (90) comprising a liquid level sensing rod (91), a wire bundle (93), and a level indicator transmitter (95). The example liquid level sensing rod (91) includes a plurality (e.g. ten) electrical contacts (97) disposed along the length of an electrically non-conductive cylindrical rod (99). The wire bundle (93) includes one electrical wire, (101a) through (101k), for each of the electrical contacts (97a) through (97k), and may include an additional, 'fail safe' wire (not shown). In an exemplary embodiment, the liquid level sensing rod (91) may also include a pair of continuity contacts (111, 113) disposed at the bottom end of the liquid level sensing rod (91). A corresponding pair of electrical leads (115) runs back to the level indicator transmitter (95) in the wire bundle (93) (the electrical leads (115) are not shown in the wire bundle (93) for clarity of illustration). The level indicator transmitter (95) may provide an electrical current to flow between the continuity contacts (111) and (113) so as to measure the electrical conductivity of the liquid (63), and thus obtain greater accuracy in the liquid level determination process.

This level indicator transmitter (95) includes a level indicator module (103) and a plurality of relays (107a) through (107k), where each relay (107) is electrically connected to a respective electrical contact (97) via an electrical wire (101). The level indicator transmitter (95) shown here is configured with 'normally open' relays (107). Accordingly, the lowermost three relays (107a-107c) have closed because the corresponding three electrical contacts (97a-97c) lie under the surface of the liquid (63). The level indicator module (103) includes a microprocessor (105) with an optional clock (109) to provide the sensing functions for the level indicator transmitter (95).

In an exemplary embodiment, the level indicator module (103) may provide an analog output ranging from 4.0 mA to 20 mA. A current of 4.0 mA is used to indicate that the bottom electrical conductor 97a lies above the level of the liquid (63). When the electrical conductor (97a) is under the level of the liquid (63), the analog output has increased to approximately 5.6 mA. Similarly, when the second electrical conductor (97b) is under the level of the liquid (63), the analog output has increased to approximately 5.6 mA. When all the electrical conductors (97a-97k) are under the level of the liquid (63), the analog output reaches the maximum value of approximately 20 mA.

Figure 8:
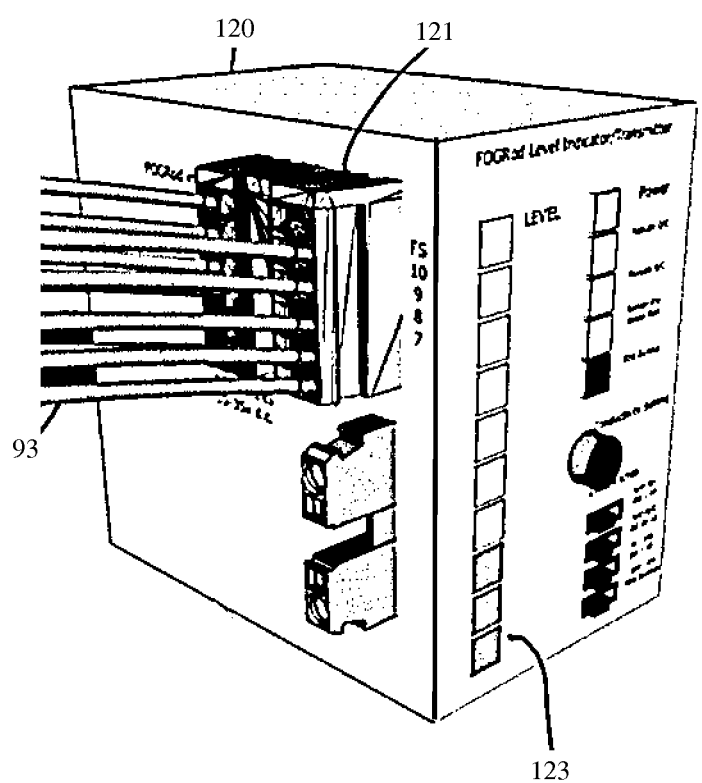
FIG. 8 is an isometric rendering of the liquid level indicator of FIG. 7.

In an exemplary embodiment, the level indicator transmitter (95) may be housed in a metal enclosure (120), shown in FIG. 8, with an electrical receptacle (121) configured to accommodate the wire bundle (93). The metal enclosure (120) may include a linear array of indicator lights (123) disposed on a front face to indicate the level of the liquid (63) in the corresponding wet well.

Figure 9:
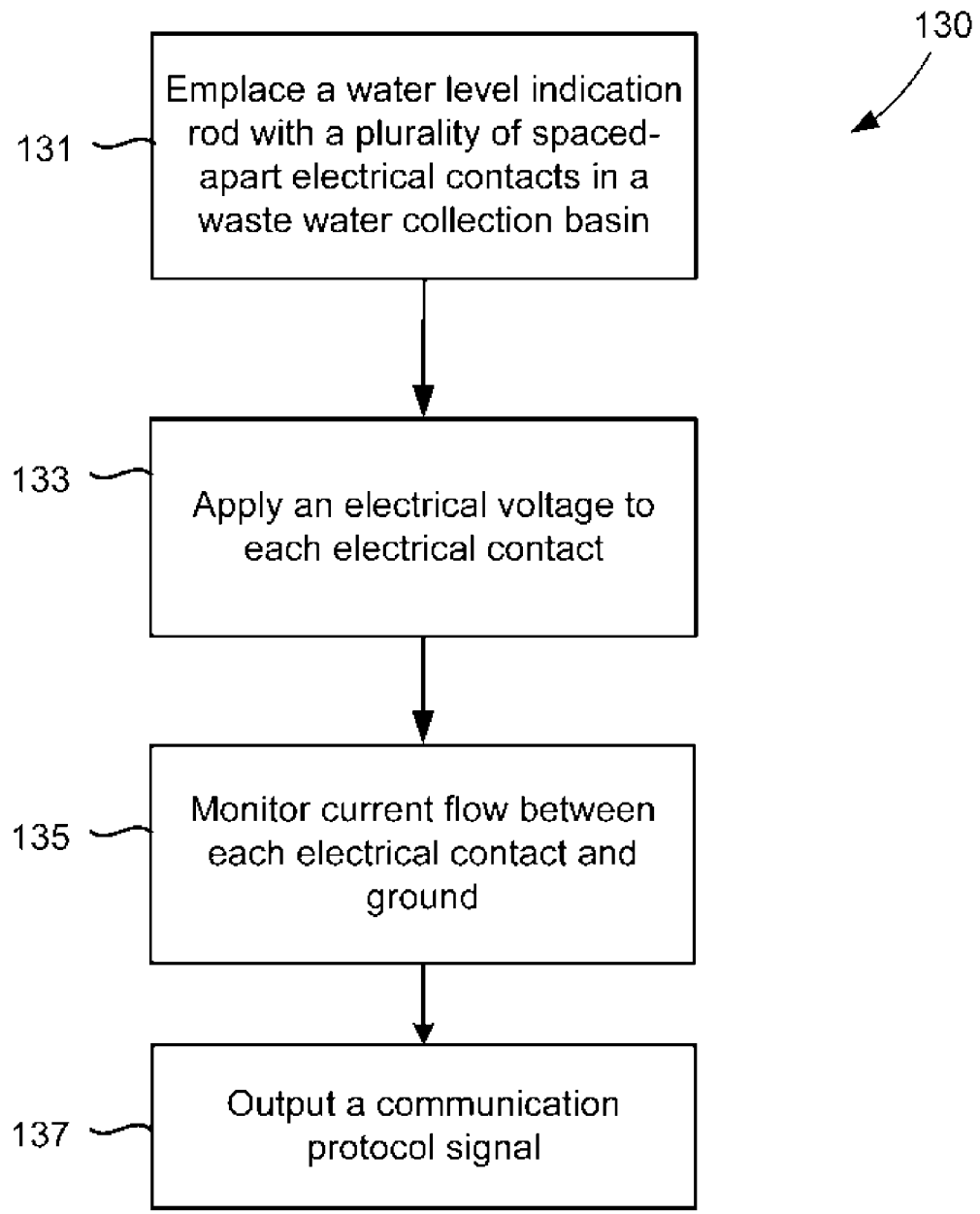
FIG. 9 is a flow diagram used in explaining operation of the liquid level indicator of FIG. 6.

The liquid level determination may be made in accordance with a flow diagram (130), in FIG. 9, in which a liquid level indication rod, such as any of liquid level indication rods (10, 40, 50, 71, or 91) is provided in a wastewater collection basin such as the wet well (61) of the wastewater management system (60), at step (131). An electrical voltage is applied to each of the electrical contacts on the liquid level indication rod (10, 40, 50, 71, or 91) so as to generate an electrical detection current, at step (133). This current is monitored for each of the electrical contacts, at step (135), and a corresponding signal is provided to the pump control unit (69), at step (137).

In addition to the above-described monitoring function, the level indicator transmitter (70) can monitor and compare the current flow or resistance for adjacent electrical contacts so as to obtain a corresponding current flow or resistance differential reading as a method of determining whether there has been an accumulation of waste material on the liquid level indication rod.

In an exemplary embodiment, we can define $I_1$ as the current through the bottom electrical contact, define $I_2$ as the current through the second electrical contact from the bottom, and define $I_3$ as the current through the third electrical contact from bottom. As the level of the liquid (15) falls, a particular electrical contact is deemed to be dry if, for example, $I_3<(I_1+I_2)/3$. And as the level of liquid rises, the same electrical contact is deemed to be wet if, for example, $I_3>(I_1+I_2)/5$. This provides some degree of hysteresis in the disclosed system.

Hysteresis is advantageous because, when the water level is decreasing, the rod is more likely to have liquid still attached above the actual water level due to the high surface tension of water. The water attached above the actual water level can still have some electrical effect and provide an erroneous reading. Therefore, the threshold for current flow needs to be set higher when the level is falling. The threshold for the bottom contact may be based on the last values of the currents through the contacts above.

The above values are simply examples of one mathematical approach. In an alternative exemplary embodiment, the system may continuously calculate the relationships between the different currents and estimate the best coefficients for wet/dry during rising and falling water levels.

In yet another exemplary embodiment of the invention, the system obtains one or more conductivity measurements, and provides that data to the user through communications or annunciation. This may serve to assist the operators with the identification of high storm water inflow; for example, the high storm water inflow determination made as a low conductivity reading of the liquid, and may further provide some indication of the pH of the liquid. Varying pH has dramatic impacts on the corrosion of the concrete, steel and other materials in the wastewater collection system and the only measurements currently made are at the treatment plant. Knowledge of the approximate pH at different points through the system is very beneficial.

Generally stated, continuous water level measurement is made possible because increasing water level allows more current to flow between a given contact and ground. That is, the more the liquid level increases, the "more" field lines, or parallel paths, are available. The conductivity (or a proxy for conductivity) may be calculated by using two closely adjacent sensors or metal contacts. This is necessary as a reference point because it is another variable that affects resistance. Once the liquid level indication rod is configured to detect continuous level, there is no need to have the start point at an electrical contact point. Advantageously, most buildup occurs at a "start point," that is, the highest level the wastewater in the wet well normally reaches. As the conductivity between an electrical contact and a ground connection is a function of the area of the electrical contact, and of the grounding component, a non-linear functional relationship may result.

Many of the specific details of certain embodiments of the invention are set forth in the above description and related drawings to provide a thorough understanding of such embodiments. One skilled in the art will understand, however, that the present invention may be practiced without several of the details described in the above description. Moreover, in the description, it is understood that the figures related to the various embodiments are not to be interpreted as conveying any specific or relative physical dimension.

The invention claimed is:

1. A method of improving the accuracy of an electrode based wastewater liquid level indicator intended to operate in a fat, oil, grease and other waste (FOG contaminant) wastewater environment, said electrode based liquid level indicator comprising:
    a wastewater liquid level measuring device intended to be at least partially immersed in a liquid waste container, said liquid level measuring device comprising a non-conductive surface with a plurality of electrodes disposed on said surface so that said electrodes are suspended at different depths in said liquid waste container;

wherein in the absence of said FOG contaminant, the level of the liquid in said liquid waste container is measured by correlating the electrical interactions between said plurality of electrodes and an electrical reference in said liquid, and wherein in the presence of said FOG contaminant, said FOG contaminants variably adhere to said measuring device and distort said electrical interactions, thereby causing inaccuracy in said measurement;

said method comprising:

using information on the distorting effect of said FOG contaminant on said electrical interactions to construct a FOG effect algorithm;

obtaining at least one measurement of the electrical interactions between said plurality of electrodes and said liquid; and using said FOG effect algorithm to correct for the distorting effect of said FOG contaminant on said electrical interactions, thereby producing FOG corrected measurements, and improving the accuracy of said electrode based liquid level indicator;

wherein said electrical interactions between said plurality of electrodes and said liquid are monitored periodically as a function of time;

wherein the distorting effect of said FOG contaminant on said electrical interactions between said plurality of electrodes and said liquid is such that at least a FOG partial water bridge is formed between at least two adjacent electrodes on said liquid measuring device, one adjacent electrode being an upper electrode mounted on a higher level in said measuring device, and one adjacent electrode being a lower electrode mounted on a lower level in said measuring device;

wherein when said lower electrode and said upper electrode are initially dry, and said liquid level in said container rises to make electrical contact with said lower electrode at time T1, said FOG partial water bridge causes said upper electrode to make premature electrical contact with said liquid at later time T2;

using said FOG effect algorithm to determine if the difference time T2−T1 is within one or more FOG partial water bridge time parameters, and if so generating a FOG alarm signal and/or correcting said measurement for the presence of FOG contaminants.

2. The method of claim 1, wherein said FOG corrected measurements are communicated to other electrical devices including control devices, fluid control devices, alarm devices, recording devices, and fluid level recording devices.

3. The method of claim 2, wherein said other electrical devices comprise at least one pump that is used to control the level of liquid in said waste container.

4. The method of claim 1, wherein said liquid level measuring device is substantially pole shaped, and wherein said non-conductive surface is a plastic surface.

5. The method of claim 1, wherein said FOG effect algorithm is implemented using at least one microprocessor and software.

6. The method of claim 1, wherein said plurality of electrodes are disposed on said surface so that no electrode is placed directly above an adjacent electrode.

7. The method of claim 1, further using automatic calibration information pertaining to the undistorted electrical interactions between said plurality of electrodes and an electrical reference in said fog effect algorithm, said undistorted electrical interactions being obtained in said liquid in the absence of said FOG contaminants.

8. A method of improving the accuracy of an electrode based wastewater liquid level indicator intended to operate in a fat, oil, grease and other waste (FOG contaminant) wastewater environment, said electrode based liquid level indicator comprising:

a wastewater liquid level measuring device intended to be at least partially immersed in a liquid waste container, said liquid level measuring device comprising a non-conductive surface with a plurality of electrodes disposed on said surface so that said electrodes are suspended at different depths in said liquid waste container;

wherein in the absence of said FOG contaminant, the level of the liquid in said liquid waste container is measured by correlating the electrical interactions between said plurality of electrodes and an electrical reference in said liquid, and wherein in the presence of said FOG contaminant, said FOG contaminants variably adhere to said measuring device and distort said electrical interactions, thereby causing inaccuracy in said measurement;

said method comprising:

using information on the distorting effect of said FOG contaminant on said electrical interactions to construct a FOG effect algorithm;

obtaining at least one measurement of the electrical interactions between said plurality of electrodes and said liquid; and using said FOG effect algorithm to correct for the distorting effect of said FOG contaminant on said electrical interactions, thereby producing FOG corrected measurements, and improving the accuracy of said electrode based liquid level indicator;

wherein said electrical interactions between said plurality of electrodes and said liquid are monitored periodically as a function of time;

wherein the distorting effect of said FOG contaminant on said electrical interactions between said plurality of electrodes and said liquid is such that at least a FOG partial water bridge is formed between at least two adjacent electrodes on said liquid measuring device, one adjacent electrode being an upper electrode mounted on a higher level in said measuring device, and one adjacent electrode being a lower electrode mounted on a lower level in said measuring device;

wherein when said lower electrode and said upper electrode are initially dry, and said liquid level in said container rises to make electrical contact with said lower electrode at time T1, said FOG partial water bridge causes said upper electrode to make a premature high resistance electrical contact $R_{fog}$ with said liquid at later time T2, and then at a still later time T3 making a normal resistance electrical contact $R_{normal}$ with said liquid when said liquid reaches the level of said upper electrode;

using said FOG effect algorithm to determine if the upper electrode T2 electrical contact is within at least one $R_{fog}$ parameter, and if so generating a FOG alarm signal and/or correcting said measurement for the presence of FOG contaminants.

9. The method of claim 8, wherein said FOG corrected measurements are communicated to other electrical devices including control devices, fluid control devices, alarm devices, recording devices, and fluid level recording devices.

10. The method of claim 8, further using said FOG effect algorithm to determine if said upper electrode electrical contact with liquid at time T2 was within at least one $R_{fog}$ parameter, and said upper electrode electrical contact with liquid at time T3 was within at least one $R_{normal}$ parameter, and said difference in times T3−T2 was within at least one FOG effect algorithm resistance versus time parameter, and if so generating a FOG alarm signal and/or correcting said measurement for the presence of FOG contaminants.

11. The method of claim 8, wherein said liquid level measuring device is substantially pole shaped, and wherein said non-conductive surface is a plastic surface.

12. The method of claim 8, wherein said FOG effect algorithm is implemented using at least one microprocessor and software.

13. The method of claim 8, wherein said plurality of electrodes are disposed on said surface so that no electrode is placed directly above an adjacent electrode.

14. The method of claim 8, further using automatic calibration information pertaining to the undistorted electrical interactions between said plurality of electrodes and an electrical reference in said fog effect algorithm, said undistorted electrical interactions being obtained in said liquid in the absence of said FOG contaminants.

15. A method of improving the accuracy of an electrode based wastewater liquid level indicator intended to operate in a fat, oil, grease and other waste (FOG contaminant) wastewater environment, said electrode based liquid level indicator comprising:
a wastewater liquid level measuring device intended to be at least partially immersed in a liquid waste container, said liquid level measuring device comprising a non-conductive surface with a plurality of electrodes disposed on said surface so that said electrodes are suspended at different depths in said liquid waste container;
wherein in the absence of said FOG contaminant, the level of the liquid in said liquid waste container is measured by correlating the electrical interactions between said plurality of electrodes and an electrical reference in said liquid, and wherein in the presence of said FOG contaminant, said FOG contaminants variably adhere to said measuring device and distort said electrical interactions, thereby causing inaccuracy in said measurement;
said method comprising:
using information on the distorting effect of said FOG contaminant on said electrical interactions to construct a FOG effect algorithm;
obtaining at least one measurement of the electrical interactions between said plurality of electrodes and said liquid; and
using said FOG effect algorithm to correct for the distorting effect of said FOG contaminant on said electrical interactions, thereby producing FOG corrected measurements, and improving the accuracy of said electrode based liquid level indicator;
wherein said method further determines approximately how high the level of the liquid is above any given electrode(s) that are submerged in said liquid by correlating the electrical interactions between said plurality of electrodes, an electrical reference in said liquid, and the level of said liquid, thereby producing a liquid level height effect algorithm, and using said liquid height effect algorithm to determine approximately how high the liquid level is above any given electrode(s) that are submerged in said liquid.

16. The method of claim 15, wherein said FOG corrected measurements are communicated to other electrical devices including control devices, fluid control devices, alarm devices, recording devices, and fluid level recording devices.

17. The method of claim 15, wherein the electrical resistance between any given electrode(s) that are submerged in said liquid continues to decrease as the level of the liquid increases still higher above the submerged electrode(s), and said liquid level height effect algorithm is at least partially based on the decrease in electrical resistance as a function of liquid level;
said liquid level height effect algorithm is used to determine when said liquid level is approximately midway between two adjacent electrodes on said liquid measuring device, one adjacent electrode being an upper electrode mounted on a higher level in said measuring device, and one adjacent electrode being a lower electrode mounted on a lower level in said measuring device, and
minimizing the build-up of said FOG contaminants on at least said lower electrode by controlling the level of the liquid in said container to a level approximately midway between said two adjacent electrodes, thereby preferentially directing any FOG contaminant build-up to a non-conducting region of said liquid measuring device.

18. The method of claim 15, wherein the average time for an electrical signal to propagate between any given electrode(s) that are submerged in said liquid and said liquid increases as the level of the liquid increases still higher above the submerged electrode(s) and said liquid level height effect algorithm is at least partially based on the increase in electrical signal propagation time as a function of liquid level; and
said liquid level height effect algorithm is used to determine when said liquid level is approximately midway between two adjacent electrodes on said liquid measuring device, one adjacent electrode being an upper electrode mounted on a higher level in said measuring device, and one adjacent electrode being a lower electrode mounted on a lower level in said measuring device, and
minimizing the build-up of said FOG contaminants on at least said lower electrode by controlling the level of the liquid in said container to a level approximately midway between said two adjacent electrodes, thereby preferentially directing any FOG contaminant build-up to a non-conducting region of said liquid measuring device.

19. The method of claim 15, wherein the electrical resistance between any given electrode(s) that are submerged in said liquid continues to decrease as the level of the liquid increases still higher above the submerged electrode(s), and said liquid level height effect algorithm is at least partially based on the decrease in electrical resistance as a function of liquid level;
wherein the level of the highest electrode in said liquid level measuring device is substantially below the overflow level of said container;
said liquid level height effect algorithm is used to determine when said liquid level is far enough above the level of the highest electrode in said liquid level measuring device so that said container is at risk of overflowing;
and using said liquid height effect algorithm to generate an overflow alarm and/or determine the relative urgency for taking corrective measures to lower the level of said liquid in said container.

20. The method of claim 15, wherein the average time for an electrical signal to propagate between any given electrode(s) that are submerged in said liquid and said liquid increases as the level of the liquid increases still higher above the submerged electrode(s) and said liquid level height effect algorithm is at least partially based on the increase in electrical signal propagation time as a function of liquid level;
wherein the level of the highest electrode in said liquid level measuring device is substantially below the overflow level of said container;

said liquid level height effect algorithm is used to determine when said liquid level is far enough above the level of the highest electrode in said liquid level measuring device so that said container is at risk of overflowing;

and using said liquid height effect algorithm to generate an overflow alarm and/or determine the relative urgency for taking corrective measures to lower the level of said liquid in said container.

21. The method of claim 15, wherein said liquid level measuring device is substantially pole shaped, and wherein said non-conductive surface is a plastic surface.

22. The method of claim 15, wherein said plurality of electrodes are disposed on said surface so that no electrode is placed directly above an adjacent electrode.

23. The method of claim 15, further using automatic calibration information pertaining to the undistorted electrical interactions between said plurality of electrodes and an electrical reference in said fog effect algorithm, said undistorted electrical interactions being obtained in said liquid in the absence of said FOG contaminants; and wherein said FOG effect algorithm is implemented using at least one microprocessor and software.

\* \* \* \* \*